Figure 1:
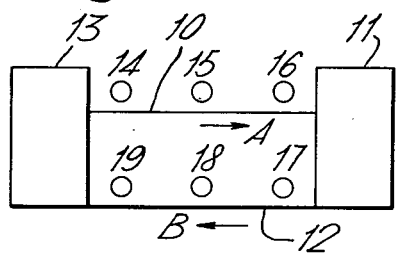
Figure 6:
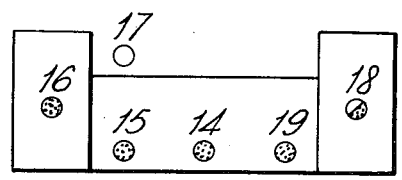
Figure 2:
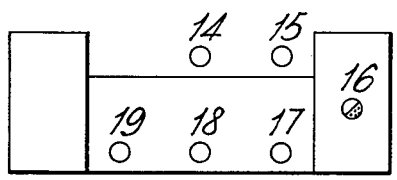
Figure 7:
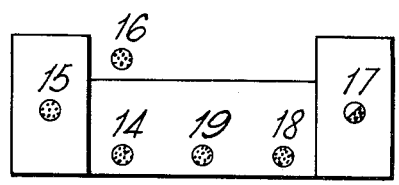

United States Patent [19]

Feasby

[11] 4,121,630
[45] Oct. 24, 1978

[54] METHOD AND APPARATUS FOR HANDLING CONTAINERS

[75] Inventor: John Anthony Feasby, Nottingham, England

[73] Assignee: Imperial Group Limited, England

[21] Appl. No.: 844,047

[22] Filed: Oct. 20, 1977

Related U.S. Application Data

[63] Continuation of Ser. No. 610,830, Sep. 5, 1975, abandoned.

[30] Foreign Application Priority Data

Sep. 27, 1974 [GB] United Kingdom ............... 42122/74

[51] Int. Cl.² ............................................. B65B 1/04
[52] U.S. Cl. ......................................... 141/1; 141/170
[58] Field of Search ............................ 141/170, 1–12, 141/129–191; 198/463, 610

[56] References Cited

U.S. PATENT DOCUMENTS

| 2,695,123 | 11/1954 | Sullentrop | 141/170 |
| 3,219,070 | 11/1965 | Nowak | 141/170 |
| 3,405,500 | 10/1968 | Rupert | 141/170 |
| 3,462,911 | 8/1969 | Schmidt | 141/170 |
| 3,835,897 | 9/1974 | Gess | 141/170 |

Primary Examiner—Houston S. Bell, Jr.
Attorney, Agent, or Firm—Larson, Taylor and Hinds

[57] ABSTRACT

The invention relates to a method of handling containers comprising the steps of (a) placing empty containers on first and second conveyors (b) conveying containers from the first conveyor serially through a filling station (c) transferring filled containers from the filling station serially onto the second conveyor (d) transferring containers serially from the second conveyor onto the first conveyor as filled containers arrive on the second conveyor and then (e) removing filled containers from both conveyors when both conveyors hold filled containers.

8 Claims, 15 Drawing Figures

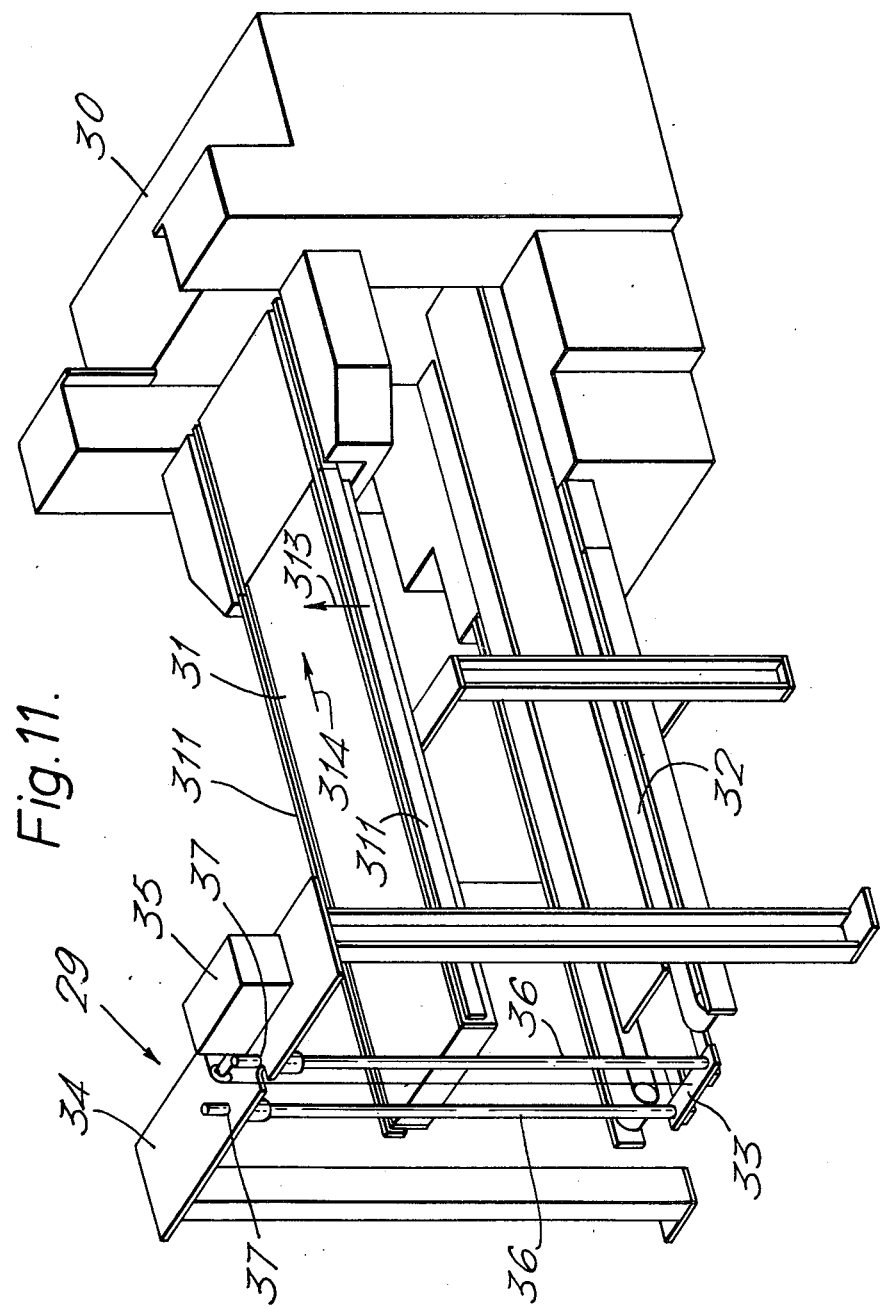

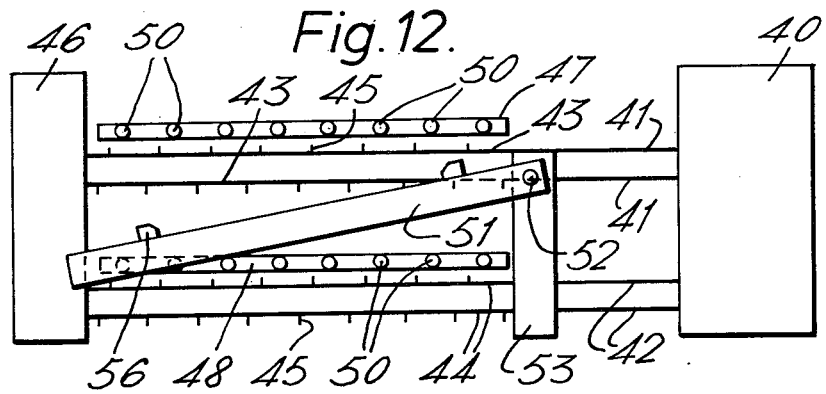
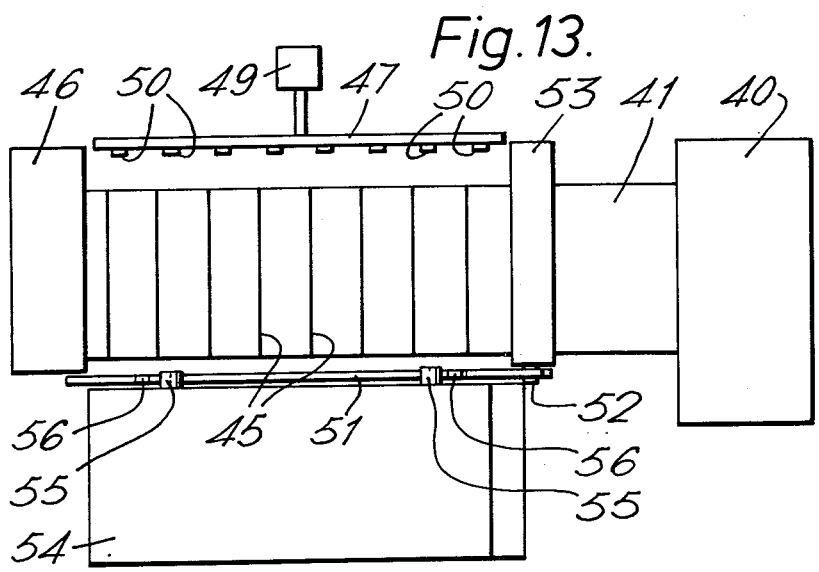
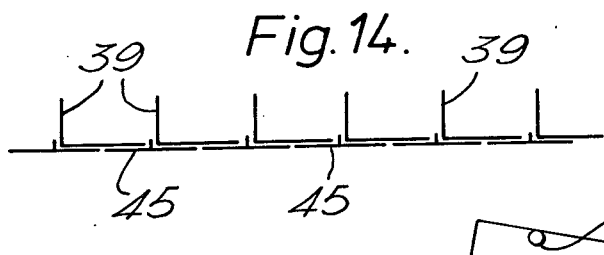
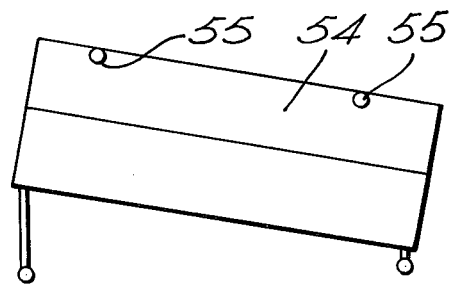

METHOD AND APPARATUS FOR HANDLING CONTAINERS

This is a continuation of application Ser. No. 610,830 filed 9/5/75, now abandoned.

This invention relates to a method of and apparatus for handling a plurality of containers.

In the cigarette manufacturing industry it is common practice for cigarettes, after having been made on a cigarette making machine, to be collected into trays for transport to a packaging station. A typical machine for collecting the cigarettes into trays is known as the Hauni "Compact Cascade". In this machine empty trays are fed manually onto a walking-beam conveyor and into a tray filling mechanism, and filled trays are collected, again manually, from a second conveyor issuing from the machine.

It is an object of the present invention to provide an improved method and apparatus for handling trays before they enter the Compact Cascade and after they leave the machine so as to improve efficiency of handling and minimize labour costs.

According to one aspect of the present invention there is provided a method of handling a plurality of containers comprising the steps of, (a) placing empty containers on first and second conveyor means, (b) conveying containers from the first conveyor means serially through a container filling station, (c) transferring filled containers from the filling station serially onto the second conveyor means, (d) transferring containers serially from the second conveyor means onto the first conveyor means as filled containers arrive on the second conveyor means, and subsequently (e) removing filled containers from the conveyor means.

Preferably, the filled containers are removed when the containers on at least the second conveyor means are filled containers.

Preferably, filled containers are removed from the conveyor means when filled containers are present on the first conveyor means.

Preferably, more empty containers are placed initially on the first conveyor means than on the second conveyor means, and filled containers are removed from the conveyor means when there is an equal number of filled containers on both conveyor means.

According to another aspect of the present invention there is provided an apparatus for handling a plurality of containers, the apparatus comprising in combination, first and second conveyor means, a container filling station associated with the first conveyor means, apparatus means for transferring filled containers from the filling station onto the second conveyor means, and apparatus means for transferring containers from the second conveyor means onto the first conveyor means.

Figure 10:
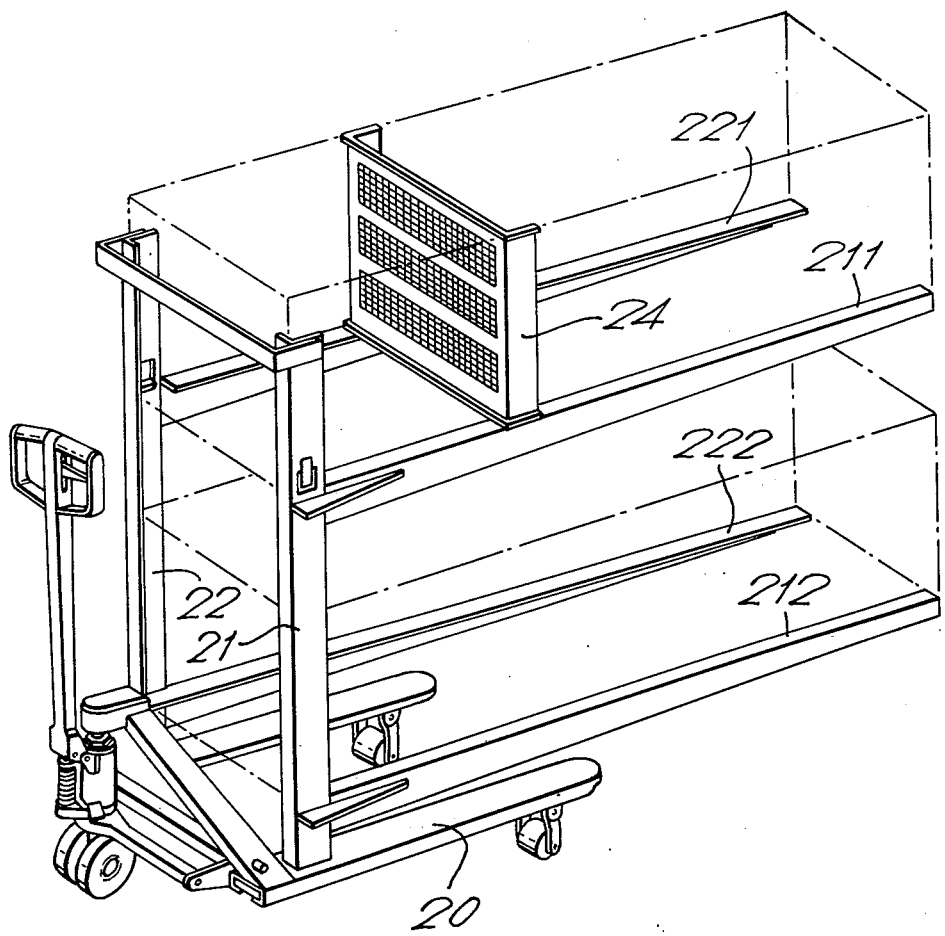

The invention will now be described by way of example with reference to the accompanying drawings in which, FIGS. 1–9 are block diagrams showing successive stages in the operation of the method, FIGS. 10 and 11 are respectively perspective views of two parts of an apparatus incorporating the invention.

FIGS. 12 and 13 are respectively diagrammatic side and plan views of alternative apparatus incorporating the invention, FIG. 14 is a detail cross-section of part of the apparatus of FIGS. 12 and 13, and, FIG. 15 is a diagrammatic side view of the trolley shown in plan view in FIG. 13.

Referring to FIGS. 1–9, there is shown diagramatically a container handling and filling apparatus comprising an upper conveyor 10 moving in the direction of arrow A and feeding into a container filling machine 11. From the filling machine 11 a lower conveyor 12 moves in the direction of arrow B. A lift conveyor 13 carries containers from the lower conveyor to the upper. Initially, as shown in FIG. 1, three empty containers 14, 15, 16 are carried on the upper conveyor 10, and a further three empty containers 17, 18, 19 on the lower conveyor 12.

Figure 3:
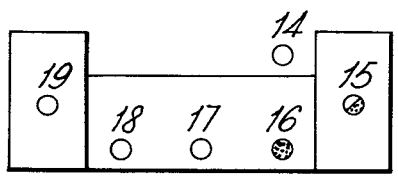
Figure 8:
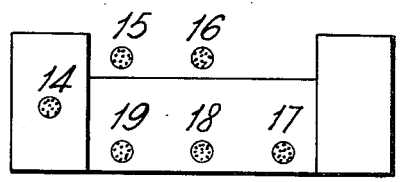
Figure 4:
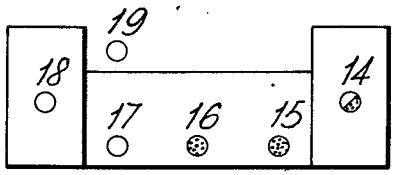
Figure 9:
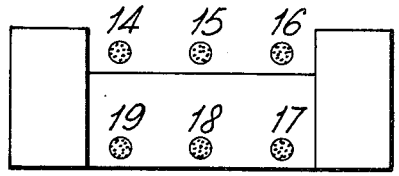
Figure 5:
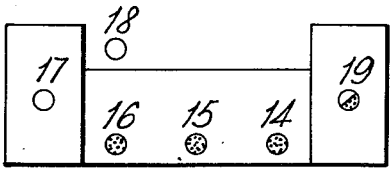

As shown in FIGS. 2–7, empty containers are fed successively from the upper conveyor 10 into the filling machine 11, where they are filled. Containers being filled in the filling machine are shown partially shaded, e.g. container 16 in FIG. 2. Each filled container passes from the filling machine onto the lower conveyor 12. Filled containers are shown fully shaded, e.g. container 16 in FIG. 3. As a filled container arrives on the lower conveyor so a container from the other end of the lower conveyor is transported by the lift conveyor 13 onto the upper conveyor 10. In FIGS. 3–5 the containers so transported onto the upper conveyor are empty containers (19, 18, 17 respectively), and in FIGS. 6–8 the containers so transported are already filled containers (16, 15, 14 respectively). The empty containers 19, 18, 17 transported to the upper conveyor now pass through the filling part of the cycle (FIGS. 5–7) and are then returned to the lower conveyor. Consequently, when filled containers 16, 15, 14 have been transported from the lower conveyor to the upper, the filling cycle for all the containers is complete (FIG. 9) and they may be removed from the conveyors by means to be described below.

A specific embodiment of a machine for carrying out the method described in FIGS. 1–9 is shown in FIGS. 10 and 11. This machine is a device for filling trays with cigarettes from a cigarette making machine, and handling the trays before and after the filling operation.

In FIG. 10 there is shown a lifting trolley 20 having welded to it two vertical posts 21, 22 each supporting two horizontal cantilevers or tines 211, 212 and 221, 222 respectively. The tines are raised and lowered by means of a tow bar arrangement 23 which may also be used to tilt the tines from the horizontal.

Each pair of tines is adapted to carry a plurality of cigarette holding trays, one of which, 24, is shown in FIG. 10.

In FIG. 11 there is shown a machine 30 (Hauni "Compact Cascade") for filling rectangular trays 24 with cigarettes from a cigarette making machine. The tray filling machine 30 is provided with elevator means (not illustrated) to transfer trays from the filling section of the machine onto the lower conveyor 32. Extending horizontally from the tray filling machine 30 are upper and lower conveyors 31, 32 respectively, located one above the other.

The upper conveyor 31 is a "walking beam" conveyor comprising a pair of fixed rails 311 and a pair of moving rails 312 (only one of which is shown). Initially, a tray 24 supplied from the lifting trolley 20 of FIG. 10 stands on the fixed rails 311. When it is required to move the trays the moving rails 312 move upwards in the direction of arrow 313 thereby lifting the tray 24 clear of the fixed rails 311.

The moving rails 312 then move in the direction of arrow 314 carrying the tray with them. At the limit of travel the moving rails lower, leving the tray on the fixed rails, and then return to their original position. The trays 24 on the conveyor 31 thus "walk" forward in a series of steps, a motion which is suitable for feeding trays into the filling machine 30.

The lower conveyor 32 is a belt conveyor which takes filled trays from the machine 30.

At the end of the conveyors opposed to the machine 30 is a tray elevator 29 comprising a tray lift 33 mounted on a gantry 34 and operated by the motor 35. The lift 33 is arranged to lift trays from the end of the lower conveyor 32 to the upper conveyor 33. Guide rods 36 attached to the lift 33 move upwards with the lift through apertures 37 in the upper part of the upper part of the gantry 34.

In operation, the pairs of tines of the lifting trolley 20 are loaded with empty trays 24. The loaded trolley 20 is elevated to the level condition and wheeled through the gantry 34, the tines 211, 212, 221, 222 being disposed on either side of the conveyors 31 and 32. The trolley 20 is wheeled forward until the ends of the tines are in engagement with the "Compact Cascade". In this position the trolley 20 is lowered through about 1" while the tines are maintained horizontal. This action deposits the empty trays on conveyors 31 and 32. On completion of the trolley positioning the tray lift 33 has meanwhile been lowered to the level of the lower conveyor and raises empty trays one by one from the lower conveyor to the upper to replace the trays being fed into the filling machine. When all the empty trays have been so raised from the lower conveyor to the upper, then filled trays are raised from the lower conveyor to the upper until all the trays on both conveyors have been filled. When all empty trays have been filled the trolley 20 is raised to its full height lifting the filled trays clear of the conveyors. The lift 33 is raised to the top of the gantry 34 and the trolley 20 and filled trays 24 withdrawn.

When the trolley is clear of the mechanism shown in FIG. 11 it is lowered to the tilted position to assist in retaining the cigarettes in the trays during transit to a packing machine.

Alternative apparatus for loading trays on and off the upper and lower conveyors described above with reference to FIGS. 1 to 9 is shown in FIGS. 12 to 15. Whereas the apparatus of FIGS. 10 and 11 is adapted to end-loading the trays on and off the conveyors, the apparatus to be described with reference to FIGS. 12 to 15 is adapted for side-loading the trays on and off the conveyors.

FIGS. 12 and 13 show, diagrammatically, a machine 40 (Hauni "Compact Cascade") for filling rectangular trays 39 similar to the tray 24 of FIG. 10 with cigarettes from a cigarette making machine. Extending horizontally from the tray filling machine 40 are upper and lower pairs of continuous running belt conveyors 41, 42 respectively, one pair 41 located above the other pair 42. The tray filling machine 40 is provided with elevator means (not illustrated) to transfer trays from the filling section of the machine onto the lower belt conveyor 42. Feeding onto and off the conveyor pairs 41, 42 respectively are upper and lower pairs of chain conveyors 43, 44. The chains in each pair are connected one to the other by flight bars 45, which, on the upper run of each conveyor 43, 44 are of inverted T-shape, as shown in cross-section in FIG. 14.

The other ends of the chain conveyors pass into a tray elevator 46 operating in a similar manner to the tray elevator 29 of FIG. 11.

Extending the length of and alongside the chain conveyors 43, 44 are corresponding push bars 47, 48 respectively which are actuated by a motor 49 to move transversely across the conveyors 43, 44. Each push bar is provided with suction pads 50. Suction is applied, when required, to the suction pads from a suction pump (not shown).

A trolley lift 51 comprising a metal bar is provided alongside the chain conveyors 43, 44 on the opposite side to the push bars 47, 48. The trolley lift 51 is pivotted 52 at a stanchion 53 located at the changeover from the chain conveyors to the belt conveyors.

Trays 39 are loaded on and off the chain conveyors from and onto a two-deck trolley 54 (FIG. 15) which is wheeled alongside the chain conveyors. The trolley 54 is designed so that in its normal transit condition its decks are tilted fore and aft about 10° to the horizontal so that, when the decks carry full trays, cigarettes in the trays tend to move into the trays during transit.

Grooved rollers 55 are provided on the side of the upper deck of the trolley and are designated to engage the trolley lift 51.

In operation, the trolley is aligned alongside the chain conveyors and the trolley lift 51 engaged under the rollers 55. Dogs 56 on the trolley lift 51 engage the rollers 55 and ensure correct positioning of the trolley. The trolley lift 51 is then raised, e.g. by a pneumatic control, not shown, so that the trolley decks are raised to the horizontal and flush with the chain conveyors 43, 44.

The push bar motor 49 is then actuated and the push bars 47, 48 traverse across the chain conveyors compressing the suction pads 50 against the sides of empty trays on the trolley. Suction is applied and the push bars return towing the empty trays from the trolley decks onto the chain flight bars. On completion of the tray feed, suction stops and the trays are left standing on the flight bars and separated by the upstanding portions of the flight bars.

Initially, a number of empty trays e.g. nine, are placed, manually or otherwise, on the belt conveyor 41. These nine empty trays act as a changeover store.

In typical operation, 24 empty trays are placed on the chain conveyors from the trolley, 12 on each conveyor. As empty trays are used from the changeover store on belt 41, filled and discharged onto the lower belt conveyor 42, a space is created on belt 41 adjacent chain conveyor 43. On the lower belt conveyor 42 a full tray eventually arrives at the end of that belt adjacent chain conveyor 44. When this occurs, the lower chain conveyor 44 indexes, moving all 12 trays through one pitch, discharging one empty tray onto the elevator 46 and receiving one full tray. The elevator takes the one empty tray up to the top chain conveyor 43 which indexes so as to receive the one empty tray and to discharge an empty tray onto belt 41 in the changeover store. The indexing of the top chain conveyor 43 is counted and when the count reaches 24 the push bars traverse across the chain conveyors pushing the full trays thereon off the flight bars and onto the trolley decks. The pushers then return. The Cascade machine 40 continues to operate on nine empty trays in the changeover store.

The trolley is lowered and replaced with one filled with empty trays.

The method and apparatus described above provide an improved system of handling and transporting containers in which the capacities of the loading and unloading conveyors are fully utilized at all times.

Other conveyor systems may be used. For example, the chain conveyors may be replaced by belt conveyors and the flight bars by T-shaped lift bars between and below the belts. The lift bars are arranged to be lifted in alignment with the trolley decks when the trays are towed from the trolley onto the conveyors, and then to lower clear of the trays so as to leave the trays standing on the conveyor belts.

What we claim is:

1. A containers handling apparatus for use in combination with an empty containers filling machine, said apparatus comprising:
    an input conveyor for conveying empty containers into the filling machine;
    an output conveyor, extending parallel to and in a vertical relationship to the input conveyor, for conveying said containers, when filled, from the filling machine;
    a first indexing conveyor for feeding empty containers onto the input conveyor;
    a second indexing conveyor for receiving filled containers from the output conveyor, and
    elevator means for continuously transferring filled containers from the second indexing conveyor onto the first indexing conveyor.

2. Apparatus according to claim 1 wherein the first and second indexing conveyors comprise chain conveyors, each chain conveyor comprising laterally extending flight bars of inverted T-shape.

3. Apparatus according to claim 1 further comprising means to remove filled containers sideways from the indexing conveyors, and means to align a container-receiving trolly alongside the first and second conveyors.

4. Apparatus according to claim 3 wherein the container removing means comprises upper and lower push bars associated with the first and second conveyors, respectively.

5. Apparatus according to claim 3 wherein the trollyaligning means comprises a bar hinged alongside the indexing conveyors and provided with trolly-receiving members.

6. Apparatus according to claim 3 wherein the container removing means comprises first and second push bars associated with the first and second indexing conveyors, respectively, the push bars being provided with suction pads whereby they can be used to pull containers onto the indexing conveyors.

7. A method of operating apparatus comprising a filling machine for filling empty containers and an apparatus comprising an input conveyor for conveying empty containers into the filling machine; an output conveyor, extending parallel to and in a vertical relationship to the input conveyor, for conveying said containers, when filled, from the filling machine, a first indexing conveyor for feeding empty containers onto the input conveyor; a second indexing conveyor for receiving filled containers from the output conveyor; and elevator means for continuously transferring filled containers from the second indexing conveyor onto the first indexing conveyor, said method comprising the steps of:
    (a) placing empty containers in serial array on the first and second indexing conveyors means,
    (b) conveying empty containers from the first indexing conveyor onto the input conveyor and thence to the container filling machine,
    (c) filling said empty containers in the container filling machine,
    (d) transferring filled containers from the container filling machine onto the output conveyor,
    (e) conveying said filled containers from the output conveyor onto the second indexing conveyor,
    (f) transferring containers from the second indexing conveyor to the first indexing conveyor by means of the elevator means until all the containers on the first and second indexing conveyors are filled containers, and
    (g) removing the filled containers from the first and second indexing conveyors.

8. A method as claimed in claim 7 comprising placing a first plurality of empty containers on the input conveyor and first indexing conveyor; placing a second plurality of empty containers on the second indexing conveyor, the second plurality being less than the first plurality and finally removing a third plurality of filled containers from the two indexing conveyors, the third plurality being less than the sum of the first and second plurality.

* * * * *